United States Patent [19]

Kremen et al.

[11] 3,877,978

[45] Apr. 15, 1975

[54] SEMIPERMEABLE MEMBRANES

[75] Inventors: Seymour S. Kremen, San Diego; Gerald E. Foreman, Del Mar; John M. Chirrick, Cardiff, all of Calif.

[73] Assignee: The United States of America as represented by the Secretary of the Interior, Washington, D.C.

[22] Filed: Mar. 27, 1974

[21] Appl. No.: 455,461

[52] U.S. Cl............... 210/23; 210/500 R; 210/508; 427/244; 427/340; 260/17 A; 260/2.5 R
[51] Int. Cl............................................ B01d 39/04
[58] Field of Search............ 117/144, 145, 161 UC; 210/500 R, 508; 260/29.6 R, 80.3 R; 264/41

[56] References Cited
UNITED STATES PATENTS

| | | | |
|---|---|---|---|
| 2,593,540 | 4/1952 | Cornwell et al. | 210/508 X |
| 2,973,285 | 2/1961 | Berke et al. | 117/145 X |
| 3,236,685 | 2/1966 | Caldwell et al. | 117/144 X |
| 3,373,056 | 3/1968 | Martin | 117/144 |
| 3,503,789 | 3/1970 | Johnson et al. | 210/508 X |
| 3,676,203 | 7/1972 | Sachs et al. | 117/145 X |

*Primary Examiner*—Michael R. Lusignan
*Attorney, Agent, or Firm*—William S. Brown; Gersten Sadowsky

[57] ABSTRACT

A method of improving the rejection performance of semipermeable membranes by incorporating thereinto an effective amount of a supplemental polymer containing a substantial amount of acetyl groups. A suitable supplemental polymer is a copolymer of vinyl acetate and one or more reactants, such as maleic acid or a half-ester thereof, crotonic acid, and lower alkyl esters of acrylic acid. The copolymer may be stabilized by subsequent treatment with a multivalent cation.

30 Claims, No Drawings

SEMIPERMEABLE MEMBRANES

This invention relates to semipermeable membranes for use in reverse osmosis or the like and more particularly to methods of improving the rejection performance of such semipermeable membranes.

Semipermeable membranes have recently gained commercial importance as a result of their employment in the treatment of aqueous solutions in order that water having greatly reduced amounts of impurities is caused to flow through the semipermeable membrane. These treatments are carried out using high pressure, above the osmotic pressure of the solution being treated, which causes water flux through the membrane to occur, and has been commonly referred to by the term "reverse osmosis". Discussions and descriptions of such treatment in general and the state of this art in the mid-1960's is set forth in the treatise *Desalinization by Reverse Osmosis*, The M.I.T. Press, 1966, which was edited by Ulrich Merten.

Semipermeable membranes are now being used in the reverse osmosis treatment of aqueous solutions either for production of relatively pure water or for concentration of the solution being treated or both. Such semipermeable membranes have been produced from various polymeric materials, such as esters of cellulose. More recently, semipermeable membranes of this type have been fabricated from polyamides, polyimides, polyphenyl esters, polysulfonamides, polybenzimidazoles, polyarlyeneoxides, polyvinylmethyl ether, and other polymeric organic materials.

In general, cellulose derivatives, such as cellulose acetate, cellulose acetate-butyrate, cellulose propionate, ethylcellulose and other cellulose esters and mixed esters, have found ready use in fabricating so-called asymmetric membranes wherein the semipermeability of the membrane results from a thin, dense skin located at one surface of the membrane, with the remaining major part of the membrane providing a more porous supporting layer formed of the same polymer. Somewhat more recently, a great deal of work has been done in developing what are now known as "composite" membranes, wherein semipermeability results from an ultrathin polymeric film of one material which is formed separately and is supported on an underlying porous substrate that may be made from a different polymer than the ultrathin film. For purposes of this application, the term "semipermeable membrane" should be understood to refer both to the asymmetric membrane and to the ultrathin film which contributes the semipermeability to the composite membrane.

Regardless of the materials from which semipermeable membranes are made, it has been found that, after membranes have been used for substantial periods of time, they begin to show a decrease in their rejection performance. One of the major uses for semipermeable membranes has been in the production of potable water from brackish water or saline or sea water, and in such instances, the performance is measured as the percentage of salt rejection and is generally so referred to hereinafter. However, it should be understood that there may be other solutes in the solutions being treated that would likewise be of interest from a rejection standpoint.

Various attempts have been made to treat such semipermeable membranes to restore their salt rejection capability, the loss of which may have been caused by hydrolysis, chemical reaction, minute mechanical defects or the like, and also to improve the salt rejection capability of membranes which, in the first instance, do not exhibit a salt rejection capability as high as considered desirable. For example, U.S. Pat. No. 3,373,056, issued Mar. 12, 1968, discloses such treatment using polyvinylmethyl ether as a supplemental polymer. However, most of these attempts have required some continuous or frequent addition to the feed solution in order to maintain the improved salt rejection capability. In many instances, unless addition is continuous, the effect is of extremely short term, and the effect is often lost completely upon depressurization. Moreover, it is common that the employment of such a supplemental material in order to improve the salt rejection capability of a semipermeable membrane concomitantly results in lowering the flux rate of the water therethrough. Thus, better methods of improving the salt rejection capability of semipermeable membranes are desired.

It is an object of this invention to provide improvements in the salt rejection performance of semipermeable membranes. Another object of the invention is to provide a method for increasing the rejection performance of semipermeable membranes without proportional decrease in the flow rate of water therethrough. A further object of the invention is to provide a method for improving the rejection performance of semipermeable membranes which requires only a brief treatment and is thereafter effective for a substantial period of time. Still another object is to provide semipermeable membranes having improved salt rejection capability as a result of treatment with supplemental polymers. These and other objects of the invention will be apparent from a reading of the following detailed description of methods of treatment of semipermeable membranes embodying various featues of the invention.

It has been found that, by contacting a semipermeable membrane with an effective amount of a supplemental polymer containing a substantial amount of acetyl groups and effecting its attachment to the membrane, the rejection performance of the membrane can be markedly increased without a proportional decrease in the rate of flow or flux therethrough. The polymer is incorporated into the semipermeable membrane in an insulubilized state, and this insolubilized polymer has been found to maintain its effectiveness for long periods of operation thereafter. The most effective supplemental polymers to date have proved to be those which are copolymers of vinyl acetate and an unsaturated carboxylic acid or the anhydride or ester thereof.

As indicated above, semipermeable membranes may be fabricated from a variety of organic polymers, and these membranes may either take the form of asymmetric membranes or the ultrathin film portions of composite membranes. The reasons for the consistent decrease in the rejection performance of semipermeable membranes employed in reverse osmosis treatment of aqueous solutions has been diagnosed variously as resulting from hydrolysis of the membrane, from chemical reactions and from slight mechanical erosion or the like. Such performance decrease results in lessening the effectiveness of the separation operation and of course is evidenced in a desalinization treatment provess by a rise in the salt content of the potable water.

It has now been found that semipermeable membranes can be rejuvinated by addition of a supplemental polymer containing a substantial amount of acetyl groups; and very importantly, this rejuvination increases salt or solute rejection while suffering no more than a minor decrease in flux. This improvement in performance resulting from the addition of a supplemental polymer is considered to have application both to semipermeable membranes whose rejection performance has deteriorated over a period of use, as well as to semipermeable membranes which initially have good flux characteristics but less than desirable solute rejection. This method of treatment by supplemental polymer addition is considered to be broadly applicable to semipermeable membranes made from cellulosic materials, for example, cellulose esters and mixed esters, and also to semipermeable membranes fabricated from a variety of other polymeric materials. One advantage of the improvement in rejection capability is the enhancement of the possibility of using a lower pressure operation, which can result in the expenditure of less pumping energy to achieve the same degree of desalinization.

Briefly, it has been found that a one-time treatment with a polymer having the desired amounts of acetyl groups significantly increases the rejection performance, and this increase in rejection performance is maintained over a substantial duration of operation thereafter. Improvement of the semipermeable membranes is effected by suitably incorporating an effective amount of the supplemental polymer into the membrane in a manner to cause relatively permanent attachment or addition thereto. Generally, the supplemental polymer is applied in the form of an aqueous solution, and in this respect, the free carboxyl groups present on the polymer provide a means for good solubilization of the polymer in a mildly alkaline solution. The polymer solution may be allowed to penetrate into the membrane so that supplemental polymer is absorbed by the polymeric active layer of the membrane before the pH of the solution is lowered to a value below 7, causing insolubilization of the supplemental polymer to occur and resulting in the desired attachment. However, the polymer solution may also be introduced into a slightly acid feed solution being supplied under pressure to an operating membrane where contract will be assured.

The supplemental polymer employed has a substantial amount of acetyl groups, and the molecular weight and carboxyl group content of the polymer is preferably such that the polymer is readily soluble in a mildly alkaline aqueous solution, e.g., pH about 7.5 to 10, which permits water to be used as the carrier in the incorporating step. Generally, the molecular weight of the supplemental polymers will fall between about 2,000 and about 50,000. The preferred supplemental polymers contain an average of at least about one acetyl group per each four carbon atoms of the chain, and some of them may approach one for every two carbon atoms. Moreover, the polymers may have one or even two caroboxyl groups and/or carboalkoxy groups per each four carbon atoms of the chain; however, they may also have far less than one.

It has been found that suitable supplemental polymers can be produced by the copolymerization reaction of an unsaturated hydrocarbon ester with an unsaturated carboxylic acid or ester thereof. Preferably, vinyl acetate is used; however, other unsaturated esters, for example, vinyl formate or vinyl propionate, may be employed in some instances. Vinyl acetate should constitute a major portion, by moles, of the copolymer; and for purposes of this application, major portion is defined as being present in at least as great a mole percent as any other reactant in the copolymerization reaction. Usually, vinyl acetate is employed in a amount at least about 50 mole percent, and in some instnces, it is used in much higher mole percentages.

The other reactant (or reactants) with vinyl acetate in the copolymerization reaction is an unsaturated carboxylic acid or ester thereof having the general formula:

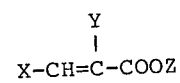

wherein X is hydrogen, lower alkyl or carboxyl, wherein Y is hydrogen, lower alkyl or $CH_2COOH$ and wherein Z is hydrogen or lower alkyl. By lower alkyl is meant a carbon chain of 1 to 3 carbon atoms. Dicarboxylic acids may be employed, and maleic acid, fumaric acid, and itaconic acid are examples thereof. The copolymerization reaction is well known in the art, and standard reaction conditions may be used. For purposes of this application, it should be understood that the anhydride may be employed in the same manner as the carboxylic acid, where the anhydride is available; and accordingly the use herein of the terminology "carboxylic acid" or a specific such acid should also be understood to include the anhydride thereof, where appropriate. Maleic acid anhydride is readily commercially available and is considered to be one of the preferred reactants. An unsaturated tricarboxylic acid, such as aconitic acid, may also be used, as may unsaturated monocarboxylic acids, such as, for example, crotonic acid, acrylic acid and methacrylic acid.

As an alternative to reacting vinyl acetate with an unsaturated carboxylic acid, an ester thereof or a partial ester thereof may be employed. For example, a lower alkyl half ester of maleic acid may be employed, such as the ethyl ester of maleic acid. Acrylate esters are also readily commercially available, and examples of suitable acrylate esters include methyl acrylate, ethyl acylate and propyl acrylate. As mentioned above, instead of copolymerizing only vinyl acetate plus a single reactant, a mixture of more than one reactant may be employed. For example, a copolymer may be made from vinyl acetate, maleic anhydride and ethyl acrylate, with vinyl acetate constituting the major portion of the mixture.

A suitable supplemental polymer may be made by reacting equimolar amounts of vinyl acetate and maleic anhydride. Moreover, all or any part of the maleic anhydride may be substituted for by a suitable half ester thereof, such as the ethyl ester of maleic acid. Instead of using equimolar amounts, a substantial excess of vinyl acetate may also be employed; for example, three or four moles of vinyl acetate may be used for each mole of maleic anhydride (or the half ester thereof). Moreover, far greater molar amounts of vinyl acetate may be used to create a satisfactory copolymer; for instance, vinyl acetate and crotonic acid may be copolymerized in a ratio of 97 to 3 moles, respectively.

The conditions under which vinyl acetate copolymerizes are well known in the chemical art and some are disclosed in U.S. Pat. No. 2,317,725 (Apr. 27, 1943). Lower alkyl acrylate esters have a tendency to facilitate the completion of the copolymerization reaction, and accordingly such acrylate esters are often employed as minor portions when vinyl acetate is copolymerized with a carboxylic acid or ester thereof.

The supplemental polymer that is commonly obtained from the copolymerization reaction of two reactants has repeating groups having the following general formula:

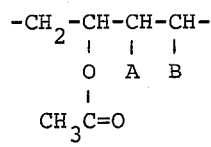

wherein A and B are either hydrogen, R, COOH or COOR, with either A or B being COOH, R being lower alkyl. It should be understood that the above formula is only a general representation of a supplemental polymer made by a copolymerization reaction of vinyl acetate with a mono or dicarboxylic acid or ester thereof, wherein, if dicarboxylic, the carboxyl groups are attached to different carbon atoms. It should likewise be understood that the copolymerization would normally achieve a random addition, and the specific sequence shown would not be precisely repeated throughout the carbon chain of the polymer. In other words, the vinyl acetate could link to another vinyl acetate molecule, and the carbon atom from the reactant carrying the A group could link to the unsubstituted carbon atom of the vinyl acetate molecule as well as to the carbon atom carrying the acetyl group.

As previously indicated, the semipermeable membrane is usually contacted with the supplemental polymer using an aqueous solution thereof. Because of the structure of the supplemental polymer, it should exhibit good water solubility at mildly alkaline solutions, for example, between about pH 7.5 and pH 10, and usually a pH in the range of about 8 to 9.5 is used.

An effective amount of the supplemental polymer to substantially increase the rejection performance can be supplied by a surprisingly dilute solution of the supplemental polymer. In this respect, effective increase in rejection performance has been achieved by treatment with aqueous solutions containing less than 0.01 weight percent of the supplemental polymer; in fact, a solution containing less than 5 mg./liter (i.e., about 5 p.p.m.) may have some effect. However, when the semipermeable membrane is initially contacted, a solution containing between about 0.1 and about 2 weight percent of the supplemental polymer is generally used, and preferably a solution between about 0.5 and about 1 weight percent is used. Obviously, higher concentrations of the polymer may be employed, the maximum amount being simply a matter of economics and solubility.

The contact time of the semipermeable membrane with the solution will of course be somewhat influenced by the concentration of the supplemental polymer present in the solution; however, relatively short contact times have been found to achieve sufficient absorption of the supplemental polymers onto the active semipermeable membrane layer, as for example, contact times between about 0.5 and about 15 minutes. For instance, adequate contact is achieved by immersing the semipermeable membrane in the aqueous solution of the supplemental polymer for a time period of about 10 minutes when a concentration of polymer in the range of about 0.5 to about 1.0 weight percent is used.

Subsequent to contact of the semipermeable membrane with the supplemental polymer to achieve the absorption, insolubilization of the supplemental polymer may be achieved by lowering the pH below neutral, e.g. to between about 6.5 and 4. Preferably, the pH is lowered by treatment of the semipermeable membrane carrying the supplemental polymer remains attached to the semipermeable membrane and effective throughout subsequent operation for long periods of time so long as the pH of the solution being treated is below neutral.

It has been found that additional insolubilization or fixation of the supplemental polymer to the semipermeable membrane is enhanced by treatment with a soluble salt of a multivalent cation, for example, zinc, chromium, aluminum, bariumm, copper, iron, etc. The multivalent cation can be provided in any convenient form, such as the chloride salt. Treatment with the multivalent cation is also effective at low concentrations, and zinc chloride at a weight percent of less than 1 weight percent has been effectively employed. Usually the multivalent cation will be used in an aqueous solution containing between about 0.5 and about 2 weight percent thereof. Of course, greater concentrations could be used, but they are not considered necessary. Usually, the multivalent cation is applied at the same time as the pH is lowered, and the cationic salt can usually be simply dissolved in the weak acid solution that is being used to treat the membrane. Again, the reaction proceeds quickly, and contact for a few seconds is considered adequate to achieve insolubilization. Usually, treatment for more than about 10 minutes would not be employed although of course longer times can be used without detriment.

As previously indicated, the addition of the supplemental polymers can be used to improve the salt rejection capability of semipermeable membranes which have deteriorated due to prolonged exposure to feed conditions above neutral or after long duration of use. It can also be used to initially improve the rejection capability of semipermeable membranes that were created to have a relatively high flux but only moderately good salt rejection. Of course, the rejection performance and/or the flux of the treated membrane may be somewhat proportional to the salt rejection capability of the membrane prior to treatment. In this respect, an asymmetric cellulose actate sheetlike membrane exhibiting a salt rejection of about 93 percnet was treated with an effective amount of the supplemental polymer and thereafter exhibited a salt rejection of about 97 to 98 percent, with only a small decrease in water flux. Similarly, a polyamide sheetlike semipermeable membrane exhibiting a salt rejection of about 88 percent and a water flux of about 15 gallons per square foot per day was treated with an effective amount of the supplemental polymer, and thereafter the membrane exhibited a salt rejection of about 98 percent while the water flux decreased only about 3.5 gallons per square foot per day.

The treatment of the semipermeable membrane may be carried out by treating the membrane itself before it is fabricated into membrane modules, the configuration in which semipermeable membranes are generally employed in reverse osmosis applications. Treatment in this manner would likely be preferred when recently fabricated or new membranes are being treated, and the treatment could be established as a part of a continuous production line. In the case of membrane modules that have deteriorated in rejection performance after use, such modules can be removed from their site of operation, treated and returned. However, it has been found that membrane modules can also be treated in situ, and this is considered to be extremely valuable because the treatment can be effected with a minimum of operational disruption. Best results are obtained with a cleaned surface.

For such in situ treatment, a small metering pump is used as an addition pump in the reverse osmosis system, following the high pressure pump that supplies the feed to the semipermeable membrane modules. Generally, the copolymer will be provided as a 5 to 10 weight percent mildly akaline solution, and it is supplied at a rate so that the polymer is present at a level of about 5 to about 25 parts per million (ppm). At this level, the normal feed solution pH of about 5-6 need not be changed. The copolymer is supplied at this rate for a time of between about 10 minutes and about three hours, depending upon the desired salt rejection and flux characteristics. The output of the membrane modules can be continuously monitored by testing methods commonly used, for example, measurement of electrical conductivity of the product water can be employed to determine the salt content; and accordingly, treatment can be halted at any time the desired characteristics are obtained. A significant improvement in salt rejection is generally noted within a few minutes of beginning treatment, and the salt rejection performance will then gradually climb until it nears a certain level. At such time, the rate of improvement of salt rejection begins to taper off significantly, and thereafter only very slight improvement may be noted, whereas the flux will begin to decrease at a noticeable rate. Once the desired rejection performance has been achieved, the further supply of copolymer by the addition pump is halted.

Depending upon cation concentration normally present in the feed solution, it may be desirable to add a multivalent cation at this time, and the same addition pump which was used to supply the copolymer is employed for this purpose. An aqueous solution containing about 0.5 to 12 weight percent of zinc chloride may be used, and the addition pump is controlled to meter this solution at a rate so that the aqueous solution being fed to the membrane contains from about 5 to about 30 ppm of zinc chloride. Operation under these conditions for about 30 minutes has been found to effect the desired insolubilization of the copolymer upon the membrane; however, treatment for a longer period of time may be employed without detrimental affect.

The following examples provide the best modes presently known to the inventors for carrying out their invention and should be helpful in better understanding of the invention; however, it should be understood that the examples are provided for purposes of illustration only and do not constitute limitations upon the invention which is defined solely by the claims at the end of this specification.

EXAMPLE I

Sheetlike cellulose acetate asymmetric reverse osmosis membranes are initially fabricated from E-398 cellulose acetate resin and are used in the treatment of saline water to produce potable water for a period of about 24 months. Initially, the asymmetric membranes exhibit a salt rejection of about 97.5 percent (based on sodium chloride) and a water flux of about 10 gallons per square foot per day (gfd). However, after operation for the indicated period, the salt rejection of the membrane decreases to about 94 percent and the water flux measures about 16 gfd.

A supplemental polymer is prepared by reacting vinyl acetate with the ethyl ester of maleic acid in equimolar amounts. The reaction is carried at about 50°C. and atmospheric pressure, using continuous agitation and using ammonium ion as a catalyst. The copolymer which is formed has the following general repeating unit:

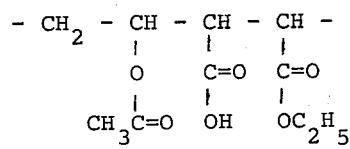

The reaction under these conditions produces a polymer having a molecular weight between about 10,000 and about 50,000. The polymer exhibits good solubility in water having a pH of about 9, and a 5 percent by weight solution is formulated at this pH, using ammonia to provide mild alkalinity.

The cellulose acetate asymmetric semipermeable membrane is immersed in this dilute solution of the supplemental polymer for about 5 minutes to absorb the polymer onto the active surface layer of the semipermeable membrane. Thereafter, the supplemental polymer is insolubilized by immersion of the membrane for about 5 minutes in a dilute aqueous solution of hydrochloric acid containing about one weight percent of zinc chloride, which solution has a pH of about 4.

Following this treatment, insolubilization of the supplemental polymer is complete, and the treated semipermeable membrane is tested using essentailly the same feed solution as it had previously been operating on for the 24-month period. The treated membrane exhibits a salt rejection of about 97.5 percent and a water flux of about 10 gfd. Substantially continuous operation under these conditions for a period of greater than 180 days shows that the salt rejection remains about 97.5 percent without further treatment and no noticeable change in flux occurs. Thus, the treatment process using the supplemental polymer is considered to be most effective and relatively permanent.

EXAMPLE II

Additional samples of the cellulose acetate asymmetric semipermeable membrane treated in Example I are treated using a supplemental polymer made from vinyl acetate and maleic anhydride wherein the mixture reacted had a ratio of 3 moles of vinyl acetate to 1 mole of maleic anhydride. The copolymerization reaction is carried out under substantially the same conditions and produces polymers have a molecular weight between about 10,000 and about 50,000.

Treatment of the membrane in one weight percent solution and insolubilization of the absorbed polymer are carried out in the same manner as in Example I. Testing of the treated membrane shows that the salt rejection increases to about 98 percent and exhibits water flux of about 10 gfd. Testing for about 180 days thereafter shows the salt rejection capability remains above 97.5 percent.

EXAMPLE III

The treatment set forth in Example II is repeated, except that the copolymerization reaction is carried out using a mixture of vinyl acetate, maleic anhydride and the ethyl ester of acrylic acid in the ratio of 3 moles of vinyl acetate to 1 mole of maleic anhydride to 3 moles of ethyl acrylate. A supplemental polymer having a molecular weight between about 10,000 and about 50,000 is produced.

Treatment of the asymmetric cellulose acetate membrane with a one weight percent of the polymer and insolubilization thereof is carried out in the same manner as described above. Testing of the treated membrane shows that the salt rejection improves to about 97 percent and the treated membrane exhibits a water flux of about 12 gfd. Subsequent testing over the same period shows that the salt rejection remains at about 97 percent.

EXAMPLE IV

The process of Example I is repeated using vinyl acetate and crotonic acid to carry out the copolymerization reaction, in a ratio of 97 moles of vinyl acetate to 3 moles of crotonic acid. The reaction is carried out at 25°C. and 27 atmospheres for a time of about 5 minutes. The resultant copolymer exhibits good solubility in water at a pH of about 8 and has a molecular weight between about 10,000 and 50,000.

Treatment of the cellulose acetate asymmetric semipermeable membrane is carried out as described above using a 0.1 weight percent solution, and insolubilization of the polymer is similarly effected. The treated membrane is similarly tested and is found to exhibit a salt rejection of about 97.5 percent and a water flux of about 14 gfd. Continued testing for the 180 day period shows that the salt rejection capability remains above 97 percent.

EXAMPLE V

A cellulose acetate asymmetric membrane is prepared using standard acetone casting techniques, and the membrane, upon initial testing, is shown to exhibit a salt rejection of about 87 percent (based on sodium chloride) and a flux of about 20 gfd. This asymmetric membrane is treated under the same conditions as set forth in Example I above. Testing of the treated membrane shows that the salt rejection improves to a level of about 97.5 percent and the water flux at this level measures about 12 gfd. Continuous testing under these conditions for about 180 days shows that the salt rejection remains above about 97 percent.

EXAMPLE VI

A composite semipermeable membrane including an ultrathin polyamide film is tested and is found to exhibit a salt rejection of about 93 percent (based on sodium chloride) and a flux of about 18 gfd. The polyamide is made from the reaction product of polyethylenimine and isophthaloyl chloride. The composite membrane is treated under the same conditions and with the supplemental polymer as set forth in Example I. Testing of the treated membrane shows that salt rejection increases to about 98 percent and the water flux measures about 11 gfd. Continued operation and/or testing for a period of about 30 days shows that the salt rejection remains at about 98 percent.

EXAMPLE VII

Asymmetric cellulose acetate sheet semipermeable membranes are fabricated into spirally wound modules for brackish water treatment. When initially installed and operated, the semipermeable membrane modules show a salt rejection of nearly 97 percent. After operation for about six months using a feed of brackish water, the pH of which is generally adjusted to between about 5 and 6, and after undergoing periodic cleaning treatments and some control upsets where the pH was higher for periods of time, the performance of the membrane modules has decreased to where the salt rejection is about 94 percent at a flux of about sixteen gfd. An addition pump is installed just upstream of the pump that raises the pressure of the aqueous feed to about 400 p.s.i., and an aqueous solution containing about 7 weight percent of the copolymer of vinyl acetate and the half ester of maleic acid (in approxiamtely equal molar amounts) is added to the brackish water feed. The 7 percent solution is at a pH of about 10, and the brackish water feed is maintained at its normal pH of about 5-6. The copolymer solution is added at a rate so that the copolymer is supplied to the membrane at a level of about 15 ppm.

Continuous monitoring of the output from the membrane module shows that the salt rejection begins to noticeably improve after only a few minutes' operation, and at the end of thirty minutes the salt rejection has reached about 96 percent while the flux remains above 15 gfd. Supply of the copolymer for another minety minutes raises the salt rejection to about 97 percent while the flux drops only 14 gfd. At this point the addition of polymer is discontinued, and supply of the normal brackish water feed at a pH of about 5 is continued. Operation at this pH level is sufficient to significantly insolubilize the copolymer; however, an aqueous solution of zinc chloride is metered into the feed solution at a level of about 30 ppm for about 10 minutes to achieve faster and more effective insolubilization. After this treatment, periodic testing shows that the treated semipermeable membrane module continues to operate with a salt rejection of about 97 percent and a flux of about 14 gfd for the next eight months without any significant change. The treatment is considered to be excellently effective inasmuch as it has halved the salt content of the product water while suffering a concomitant decrease in flux of less than 15 percent.

The invention provides a valuable, one-time treatment for semipermeable membranes that is capable of being economically practiced and that is effective to substantially raise the salt rejection performance for long periods of time. The invention is valuable as a method of rejuvenating sheetlike semipermeable membranes, such as those presently used in spiral modules, and tubular configuration semipermeable membranes so as to restore them to their initial levels of salt rejection. The treatment method attaches the supplemental polymer uniformly throughout the dense, active semipermeable polymeric layer. The invention has further application to the treatment of membranes which are fabricated to have high flux and only moderate salt rejection capability, by raising the salt rejection performance without sigfnificant decrease in the flux so as to provide an initially better performing membrane. Although the invention has been described with regard to certain preferred embodiments, it should be understood that modifications as would be obvious to one having the ordinary skill in this art are considered as falling within the scope of the invention which is defined by the claims appended hereto.

Various features of the invention are set forth in the claims which follow.

What is claimed is:

1. A method of improving the rejection performance of semipermeable reverse osmosis membranes comprising incorporating into the membrane an effective amount of a supplemental polymer consisting of a copolymer of vinyl acetate and one or more members selected from the group having the formula:

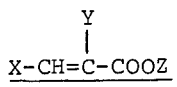

wherein X is hydrogen, lower alkyl, or carboxyl, wherein Y is hydrogen, lower alkyl or $CH_2COOH$ and wherein Z is hydrogen or lower alkyl and wherein said copolymer is prepared from a mixture including at least about 50 mole percent vinyl acetate, whereby the rejection performance of the membrane is improved.

2. A method in accordance with claim 1 wherein said supplemental polymer is a copolymer of vinyl acetate and maleic acid.

3. A method in accordance with claim 1 wherein said supplemental polymer is a copolymer of vinyl acetate and a lower alkyl half-ester of maleic acid.

4. A method in accordance with claim 1 wherein said semipermeable membrane is made of cellulose acetate.

5. A method in accordance with claim 1 wherein said copolymer contains maleic acid, crotonic acid or a lower alkyl ester of acrylic acid.

6. A method in accordance with claim 1 wherein said supplemental polymer contains the following repeating group:

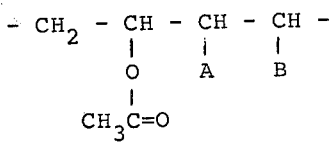

wherein A and B are selected from hydrogen, R, COOH and COOR and either A or B is COOH, R being lower alkyl.

7. The method of claim 1 in which the incorporation of the supplemental polymer is achieved by contacting the membrane with an aqueous solution of about 0.1 to 2 weight percent of the polymer for a period of about 0.5 to 15 minutes.

8. A method in accordance with claim 1 wherein said incorporating is effected using a dilute slightly alkaline aqueous solution of said supplemental polymer which is insolubilized for attachment to said membrane by lowering the pH of the solution below neutral.

9. A method in accordance with claim 1 wherein treatment with a multivalent cation is used in said incorporation of said supplemental polymer into said membrane.

10. A method in accordance with claim 6 wherein said semipermeable membrane is made of a cellulose ester.

11. A method in accordance with claim 6 wherein said semipermeable membrane is made of cellulose acetate or of a mixture of cellulose acetate and another cellulose ester.

12. The method of claim 7 in which the aqueous solution of the polymer has a pH of about 7.5 to 10.

13. The method of claim 7 in which the contacting consists of immersion of the membrane in the aqueous solution of the polymer.

14. The method of claim 12 in which the polymer is subsequently insolubilized by lowering the pH to about 6.5 to 4.0.

15. The method of claim 14 in which the aqueous solution of the polymer additionally contains about 0.5 to 2.0 weight percent of a multivalent cation.

16. The method of claim 15 in which the multivalent cation is zinc.

17. A method in accordance with claim 9 wherein said cation is zinc.

18. A semipermeable reverse osmosis membrane having improved rejection performance, which membrane has uniformly attached thereto an effective amount of an insolubilized supplemental polymer consisting of a copolymer of vinyl acetate and one or more members selected from the group having the formula:

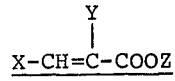

wherein X is hydrogen, lower alkyl, or carboxyl, wherein Y is hydrogen, lower alkyl, or $CH_2COOH$ and wherein Z is hydrogen or lower alkyl, and wherein said copolymer is prepared from a mixture including a major portion of vinyl acetate.

19. A membrane in accordance with claim 18 wherein said supplemental polymer is a copolymer of vinyl acetate and maleic acid.

20. A membrane in accordance with claim 18 wherein said supplemental polymer is a copolymer of vinyl acetate and a lower alkyl half-ester of maleic acid.

21. A membrane in accordance with claim 18 wherein said supplemental polymer is a copolymer of vinyl acetate and crotonic acid.

22. A membrane in accordance with claim 18 wherein said semipermeable membrane is made of cellulose acetate.

23. A membrane in accordance with claim 18 wherein said polymer contains the following repeating group:

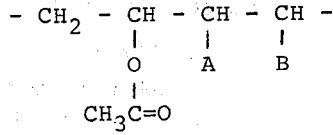

wherein A and B are selected from hydrogen, R, COOH and COOR and either A or B is COOH, R being lower alkyl.

24. A membrane in accordance with claim 19 wherein said supplemental polymer includes a lower alkyl ester of acrylic acid.

25. A membrane in accordance with with claim 23 wherein said semipermeable membrane is made of a cellulose ester.

26. A membrane in accordance with claim 23 wherein said semipermeable membrane is made of cellulose acetate or of a mixture of cellulose acetate and another cellulose ester.

27. A membrane in accordance with claim 23 wherein said semipermeable membrane is made of a polyamide.

28. A membrane in accordance with claim 23 wherein said insolubilized supplemental polymer includes a multivalent cation which assists in rendering it insoluble.

29. A membrane in accordance with claim 28 wherein said cation is zinc.

30. In a process for desalination of saline water by reverse osmosis comprising contacting the saline water under pressure with a reverse osmosis membrane, the improvement comprising using the membrane of claim 18 as the reverse osmosis membrane.

* * * * *